2,884,689

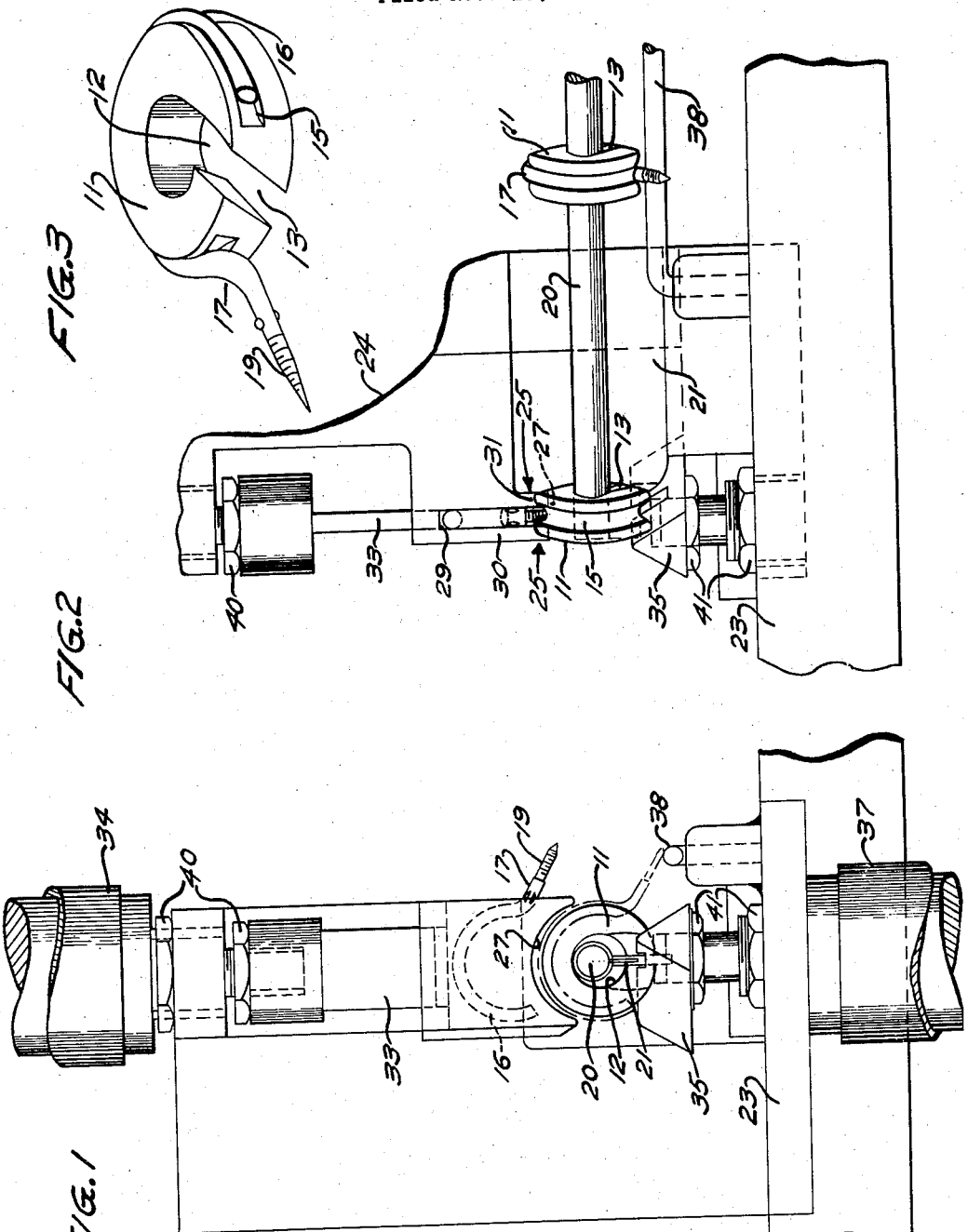

MACHINE FOR ASSEMBLING SCREW EYES AND PORCELAIN INSULATORS

Raymond O. Wondra, Downers Grove, Ill., assignor to Western Electric Company, Incorporated, New York, N.Y., a corporation of New York Application November 10, 1954, Serial No. 467,931

3 Claims. (Cl. 29—203)

This invention relates to apparatus for assembling insulators with attachments and more particularly to a device for assembling a screw eye and an annular insulator.

It is an object of this invention to provide an improved and efficient device for quickly assembling insulators with attachments.

Another object of this invention is to provide a device for assembling screw eyes and insulators and for automatically grouping the assembled insulated screw eyes to facilitate packaging of a predetermined number of such assemblies in each package.

An apparatus illustrating one embodiment of the invention for assembling screw eyes and insulators may include a cylindrical mandrel for slidably supporting an annular insulator of a well-known type having a diagonal slot for passage of a wire to be held by the insulator and a circumferential groove for receiving a hook end of a screw eye, a slotted member positioned above the insulator for guiding the hook end of the screw eye into the circumferential groove in the insulator positioned on the mandrel, a movable clamping member positioned below the insulator to be raised to urge it into abutment with the slotted member, and means for urging the hook of the screw eye downward and into the circumferential groove in the insulator. A guide rail is provided to support the threaded end of the screw eye after the insulator has been assembled with it and as this assembly is moved along the mandrel.

A complete understanding of the invention may be obtained from the following detailed description of the apparatus forming one specific embodiment thereof, when read in conjunction with the drawings, in which Fig. 1 is a front elevation of the device embodying the invention with a screw eye and an insulator positioned to be assembled therein, Fig. 2 is a side elevation thereof, and, Fig. 3 is a perspective of the assembled screw eye and insulator.

Referring now in detail to the drawings, there is shown an annular insulator 11 of a well-known type having a central opening 12, a diagonal slot 13, and a circumferential groove 15 adapted to receive a hook end 16 of a screw eye 17 having a threaded tail end 19. A cylindrical mandrel 20 having a diameter slightly smaller than the central opening 12 in the insulator 11 is supported by a thin vertical steel strip 21 which is rigidly secured to a base 23 in such a manner that the insulator 11 may be placed on the mandrel 20 at one end and slid off at the other end, the mandrel passing through the central opening 12 and the strip support 21 passing through the diagonal slot 13 as illustrated in the drawings. Because the slot 13 is skewed with respect to the axis of the insulator 11, the insulator will be skewed slightly with respect to the mandrel 20 as it passes along the mandrel.

A frame 24 having a depending slotted portion 25 with arcuate lower surfaces 27 is secured to the base 23 to position the slotted portion 25 above the front end of the mandrel 20. A slot 29 in the slotted portion 25 and guiding portions 31 and 32 of the slotted portion 25 are provided to hold by friction the hook end 16 of the screw eye 17 above an insulator 11 positioned on the end of the mandrel 20. The operator may push the hook end 16 of the screw eye 17 into the slot 29 where it is held in correct position by friction or the operator may grasp the tail end 19 of the screw eye and hold it in position during the assembly operation. The arcuate lower surfaces 27 engage the insulator 11 to maintain it in clamping position. A rectangular ram 33 is positioned above the slot 29 and is moved by an upper air cylinder 34 supported by the frame 24 downward through the slot 29 to force the hook end 16 of the screw eye 17 into the groove 15 to grip the insulator 11. Lock nuts 40 are provided to permit adjustment and determine the lowest point of travel of the end of the ram 33.

A clamping member 35 of triangular cross section is positioned below the front end of the mandrel 20 with its upper edge parallel to the diagonal slot 13 and adapted to be raised by a lower air cylinder 37 secured to the base 23 to engage a portion of the walls of the slot 13 of the insulator 11 to urge it into abutment with the arcuate surfaces 27 of the depending portion 25 of the frame 23. Thus, the insulator 11 is held in clamped position for assembly with the circumferential groove 15 in the insulator 11 in alignment with the slot 29. Lock nut 41 is provided to adjust and determine the highest point of travel of the clamping member 35.

A guide rail 38 which is supported above the base 23 and parallel to the mandrel 20 is provided for supporting the threaded tail end 19 of the screw eye 17 to maintain it in a desired predetermined position after the hook end 16 has been pushed into the groove 15 in the insulator 11. As the insulators and screw eyes are assembled they are moved along the mandrel until a predetermined number for packaging is accumulated, after which these assemblies are swept or slid off the rear end of the mandrel into a container which is made into a package.

In operating the device, an insulator 11 is placed on the front end of the mandrel 20 and the hook 16 of a screw eye 17 is held in the slot 29 with its hook opening facing the insulator 11. The lower air cylinder 37 is then actuated to raise the clamping member 35 into engagement with the insulator 11 to push it into abutment with the arcuate surfaces 27 of the depending portion 25 of the frame 24. The upper air cylinder 34 is then actuated to lower the ram 33 to force and spring the hook 16 of the screw eye 17 into the circumferential groove 15 to grip the insulator 11. The ram 33 is now raised and the clamping member 35 lowered, and the assembled screw eye and insulator is moved back along the mandrel with the threaded tail end 19 of the screw eye resting on the rail 38. After a predetermined number of insulators and screw eyes have been assembled and accumulated on the mandrel they are slid along the mandrel to the back end thereof where they are removed in a group and packaged.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for assembling a screw eye with an annular insulator having a diagonal slot and a circumferential groove for receiving the screw eye, comprising a base, a mandrel supported above the base for passing through and supporting the insulator, a frame mounted on the base and having a pair of spaced depending portions for holding a screw eye, a clamping member movably mounted on the base and having a pair of intersecting surfaces for entering the slot and engaging the walls thereof for preventing breakage of the insulator during the assembly operation, a ram movably mounted between said spaced depending portions for forcing the screw eye onto the insulator and into the circumferential groove therein, and means on the frame for actuating the ram.

2. An apparatus for assembling a screw eye and an annular insulator having a diagonal slot and a circumferential groove for receiving the screw eye, comprising a base, a strip secured to the base, a cylindrical mandrel secured to the strip for passing through and supporting the insulator, said strip passing through the diagonal slot in the insulator, a frame mounted on the base and having a pair of spaced depending portions adapted to engage the insulator, said spaced depending portions also holding a screw eye therebetween, a clamping member of triangular cross section movably mounted on the base and positioned on a diagonal with respect to said strip for partially entering said diagonal slot in the insulator and engaging the walls thereof to move said insulator into engagement with the depending portions of the frame and to support said insulator, means on the base for actuating the clamping member, a ram movably mounted on the frame and between the spaced depending portions for forcing the screw eye onto the insulator and into the circumferential groove thereof, and means on the frame for actuating the ram.

3. An apparatus for assembling a screw eye and an annular insulator having a diagonal slot, which comprises a base, a flat member secured to the base in a vertical position, a mandrel secured to the flat member for slidably supporting such an insulator, a pair of guiding members spaced in a parallel facing relationship and positioned above one end of the mandrel, said guiding members cooperating to frictionally maintain a hook end of a screw eye therebetween and in the plane of an insulator placed on said one end of the mandrel, a clamping member movably mounted on the base and having a pair of intersecting surfaces for entering the slot in said insulator and engaging the walls thereof for supporting the insulator, a movable element positioned above the space between said guiding members, means for forcing the movable element downward through the space between the guiding members to force the screw eye into assembly with the insulator, means for varying the lowermost position to which the movable element is forced, and a rail on the base for supporting a threaded end of the screw eye as the assembled insulator and screw eye rest on the mandrel.

References Cited in the file of this patent
UNITED STATES PATENTS

| | | |
|---|---|---|
| 1,694,875 | Gaisman | Dec. 11, 1928 |
| 1,830,021 | Forney | Nov. 3, 1931 |
| 2,172,847 | Nydegger et al. | Sept. 12, 1939 |
| 2,198,740 | Redman | Apr. 30, 1940 |
| 2,303,689 | Graham | Dec. 1, 1942 |
| 2,567,547 | Bussing | Sept. 11, 1951 |
| 2,591,203 | Schmaltz | Apr. 1, 1952 |